July 28, 1931.  T. SLOVINSKI  1,816,058
HOSE COUPLING
Filed June 27, 1929
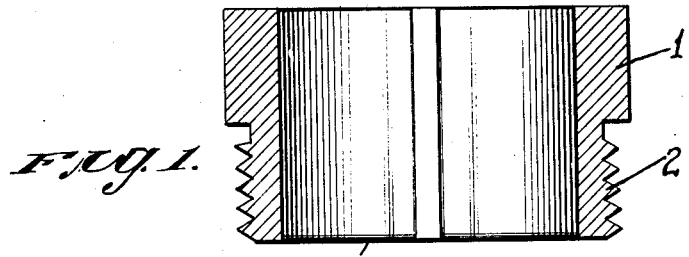
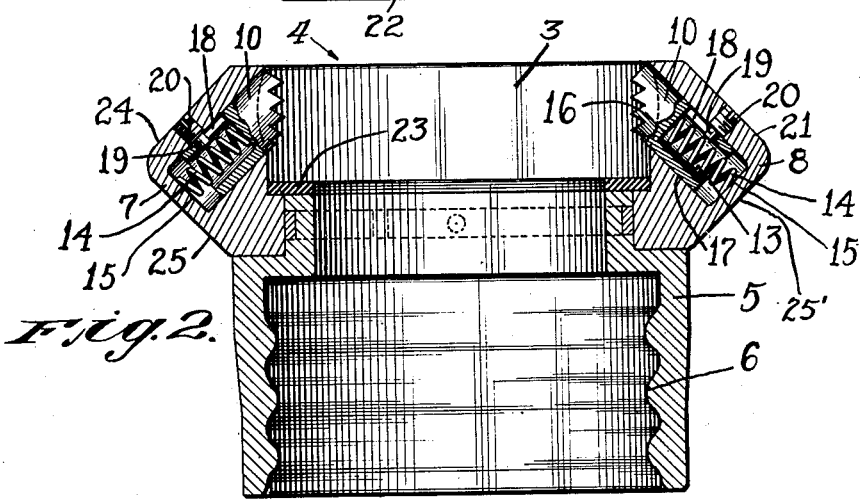
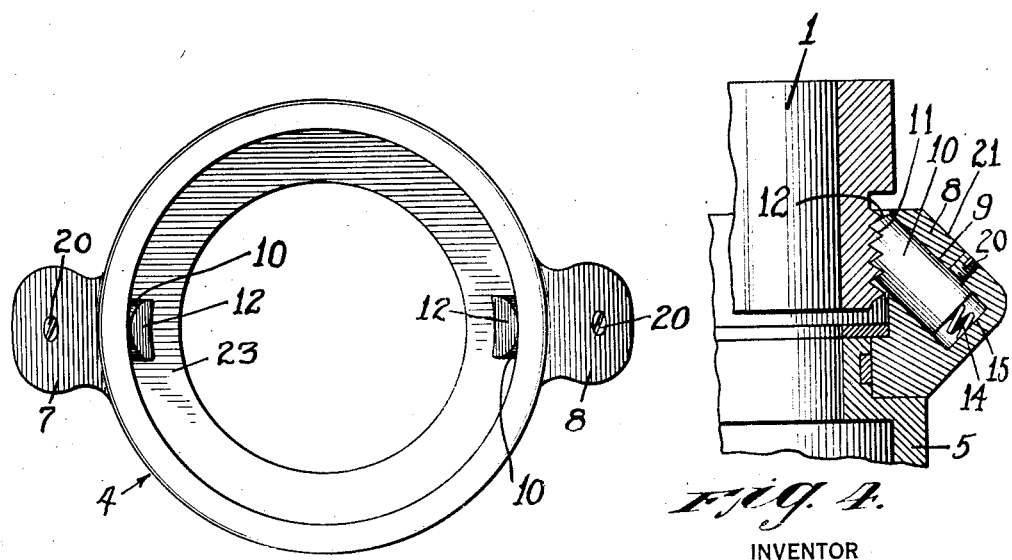
INVENTOR
Theodore Slovinski
BY
ATTORNEY Patented July 28, 1931

1,816,058

UNITED STATES PATENT OFFICE

THEODORE SLOVINSKI, OF GRAND RAPIDS, MICHIGAN

HOSE COUPLING

Application filed June 27, 1929. Serial No. 374,201.

This invention relates to improvements in hose couplings, and one of the objects of the invention is to provide a device of this type which will be stronger and more efficient than devices of this type as hitherto constructed.

Another object of the invention is to provide new and improved means whereby a hose connection of this type may more readily withstand the rough handling to which such mechanism is ordinarily subjected.

The invention accordingly consists in the features of construction, combinations of elements and arrangements of parts, which will be exemplified in the construction hereinafter described, and the scope of the application of which will be indicated in the following claims.

In the accompanying drawings, wherein I have illustrated a preferred form of embodiment of my invention, Figure 1 is a vertical sectional view of the ordinary male part usually employed in hose connections;

Figure 2 is a similar view showing the female part of the assembly into which the male part is to be screwed;

Figure 3 is a top plan view of the female part of the device as shown in Figure 2, and Figure 4 is a vertical sectional view, upon an enlarged scale, of the righthand side of the device as shown in Figure 2.

Referring now to the drawings, wherein similar reference characters refer to similar parts throughout the several views of the drawings, the reference numeral 1 denotes the male member 1 of a hose or hydrant, provided with the threads 2, said threaded part 2 of the male member 1 being adapted to be inserted into the recess 3 of the female member 4 which, as above noted, is unthreaded and is adapted to receive the male member by a straight thrust, but which forms a circular recess, adapted to receive the threaded male member.

The female member 4 of the coupling is connected with a fitting 5 recessed or corrugated as at 6 to receive the end of a hose, it being understood that the female coupling member 4 is connected to the fitting 5 so as to have a free rotative movement with relation thereto.

In practice, the fitting 5 and the male member of the assembly 1 are relatively rotatively stationary.

The female member 4 is provided with a pair of outstanding ears or lugs indicated at 7 and 8, said ears forming abutments adapted to be engaged by the hand of the operator or by a wrench in uniting the male and female parts together when initial connection has been established, as will hereinafter be described.

Referring now to Figure 4 of the drawings which represents, upon an enlarged scale, the means employed to effect a screw-threaded engagement when the male member 1 is inserted in the aperture 2 of the female part, 9 denotes a circular recess or bore formed in the lug 8 at an angle of approximately 45 degrees with respect to the longitudinal axis of the male and female parts 1 and 4. 10 represents a circular block or dog slidably mounted within the recess 9 and having a screw-threaded portion 11 at its outer end, the upper and outer end of said dog being provided with a cam surface 12. The circular block or dog 10 is provided with a circular recess 13, which is adapted to receive the extensile spring 14 which works between the bottom wall 15 of the recess 9 and the abutment 16, formed by the upper end of the recess 13.

The wall 17 formed by the circular recess is provided with the elongated slot 18 which is entered by the end 19 of a screw 20 extending through the inclined face 21 of the lug or ear 8. The end 19 of the screw 20 limits the sliding movement of the dog or circular threaded block 10.

It will be understood, of course, that a construction such as has just been described, is located upon the opposite side of the female part of the coupling in the ear or lug provided in that position, as illustrated in Figure 2 of the drawings.

Having thus described the construction of this preferred embodiment of my invention, the operation thereof, which should be obvious, is substantially as follows;

When the male part 1 of the coupling is inserted into the female part 4, the threads 2 engaging the cam surface 12 of the dogs 10 will cam said dogs rearwardly and downwardly until the end 22 of the male part of the coupling has engaged with the gasket 23 of the female member. The parts are so arranged that when this engaging position of the male and female parts of the coupling has been reached, the dogs 10 will be pressed forwardly and upwardly to engage their threaded ends with the threads 2 of the male member, whereby a slight further turn of the female part of the coupling will force the male and female members thereof into tight engagement, that is to say, the end 22 of the male member 1 will be held in water-tight engagement with the gasket 23 of the female part of the coupling.

It will be noted that the outstanding ears or lugs 7 and 8 have inclined surfaces 24 and 25. This construction is provided so as to minimize the chance of the connected parts of a hose being rent asunder, due to contact of the hose with exterior objects, such, for instance, as when the hose is being drawn over a curb or up a flight of stairs, the inclined surfaces insuring that the point of connection of the hose sections will cam over any obstructions such as those above outlined.

It will accordingly be seen that I have provided a construction, well adapted to attain, among others, all the ends and objects of the invention in a very efficient manner. By reason of the fact that the automatic screw-connecting means of the male and female parts are located in the laterally extending ears of the female part, there is provided a strong and rigid connection, so that relative endwise thrusts or stresses will not effect a disengagement of the connected hose sections. Moreover, the operative mechanism of the device is readily accessible for repair or replacement by merely removing the screws 20, whose faces are flush with the inclined faces 24 of the lugs or ears 7 and 8.

While I have shown the automatic screw-engaging parts of the female section of the hose coupling in opposed diametrical relation, it will be understood that this relation may be varied or that more than two similarly constructed automatically engaging parts may be utilized without departing from the scope of the present invention.

As many changes could be made in this construction without departing from the scope of the following claims, it is intended that all matter contained in the above description or shown in the accompanying drawings shall be interpreted as illustrative only and not in a limiting sense.

Having thus described my invention, what I claim as new and desire to secure by Letters Patent is:

1. In a hose coupling, a rotative member provided with spaced projecting lugs whereby said member may be rotated, said lugs being formed with cylindrical cavities upwardly and inwardly inclined with respect to the axis of said member, said cavities being open at the top and closed at the bottom, cylindrical dogs movably fitting the cavities in the lugs, each of the said dogs having a chamber open at its lower end, coil springs arranged in said chambers of the dogs and acting against the bottoms of the cavities in the lugs to press the dogs upwardly, and means removable from the exterior of the lugs to limit the upward movement of the dogs.

2. In a hose coupling, a rotative member provided with spaced projecting lugs whereby said member may be rotated, said lugs being formed with cylindrical cavities upwardly and inwardly inclined with respect to the axis of said member, said cavities being open at the top and closed at the bottom, cylindrical dogs movably fitting the cavities in the lugs, each of the said dogs having a chamber open at its lower end, coil springs arranged in said chambers of the dogs and acting against the bottoms of the cavities of the lugs to press the dogs upwardly, each of the said dogs having a superficial longitudinal slot, and a set screw removable from the exterior of the lug and adapted to limit the upward movement of the dog.

In testimony whereof, I hereunto affix my signature.

THEODORE SLOVINSKI.